US007967458B2

(12) United States Patent
Karpus et al.

(10) Patent No.: US 7,967,458 B2
(45) Date of Patent: Jun. 28, 2011

(54) MIRROR ASSEMBLY WITH SINGLE HEATING ELEMENT FOR MULTIPLE SURFACES

(75) Inventors: Michael E. Karpus, Macomb Township, MI (US); Gary J. Sinelli, Birmingham, MI (US)

(73) Assignee: SMR Patents S.a.r.l., Luxembourg (LU)

( * ) Notice: Subject to any disclaimer, the term of this patent is extended or adjusted under 35 U.S.C. 154(b) by 38 days.

(21) Appl. No.: 12/489,396

(22) Filed: Jun. 22, 2009

(65) Prior Publication Data

US 2009/0316265 A1 Dec. 24, 2009

Related U.S. Application Data

(60) Provisional application No. 61/074,620, filed on Jun. 21, 2008.

(51) Int. Cl.
*G02B 7/182* (2006.01)

(52) U.S. Cl. ........................................................ 359/872

(58) Field of Classification Search .................. 359/512, 359/871, 872
See application file for complete search history.

(56) References Cited

U.S. PATENT DOCUMENTS

| | | | | |
|---|---|---|---|---|
| 6,420,684 | B2 | 7/2002 | Higgins | |
| 7,202,445 | B2 | 4/2007 | Yamada | |
| 7,230,207 | B2 | 6/2007 | Witzke et al. | |
| 7,400,435 | B2 | 7/2008 | Byers et al. | |
| 2002/0154379 | A1 * | 10/2002 | Tonar et al. | 359/267 |

* cited by examiner

*Primary Examiner* — Euncha P Cherry
(74) *Attorney, Agent, or Firm* — Reising Ethington P.C.

(57) ABSTRACT

A rearview mirror assembly for a motor vehicle includes a mirror bracket fixedly secured to the motor vehicle. A mirror case is secured to the mirror bracket. The mirror case defines a primary opening. A backing plate is operatively connected to the mirror case. A mirror is fixedly secured to the backing plate. The mirror defines a substrate having a first surface and a second surface. The second surface defines a primary mirror surface and a spot mirror surface formed within the second surface. The rearview mirror assembly also includes a heating element fixedly secured to the second surface of the mirror for heating the mirror. The heating element includes a primary portion fixedly secured to the primary surface and a secondary portion fixedly secured to the spot mirror surface.

13 Claims, 3 Drawing Sheets

MIRROR ASSEMBLY WITH SINGLE HEATING ELEMENT FOR MULTIPLE SURFACES

This patent application claims priority to a U.S. provisional patent application having Ser. No. 61/074,620, which is hereby incorporated by reference.

BACKGROUND ART

1. Field of the Invention

The invention generally relates to rearview mirror assemblies for motor vehicles. More particularly, the invention relates to rearview mirror assemblies having a heating element to maintain the usability of the rearview mirror assembly in all weather conditions.

2. Description of the Related Art

Rearview mirror assemblies for motor vehicles are well known. Rearview mirror assemblies having heating elements are also known. The heating elements are difficult to use when the rearview mirror assembly includes a mirror having a substrate with surfaces that extend through multiple planes. More specifically, heating elements are difficult to use with mirrors that have a substrate that define more than one mirror. Such configurations include a rearview mirror assembly having a primary mirror and a spot mirror. A conventional heating element will not conform to the depression in the area of the spot mirror while it is adhered to the area of the primary mirror.

Some mirror assemblies incorporate a plurality of heating elements, one for every surface associated with a reflective surface. This solution is deficient in that it requires a great deal of manufacturing technique to maintain an electrical connection across all of the surfaces while assembling the mirror assembly.

SUMMARY OF THE INVENTION

A rearview mirror assembly for a motor vehicle includes a mirror bracket fixedly secured to the motor vehicle. A mirror case is secured to the mirror bracket. The mirror case defines a primary opening. A backing plate is operatively connected to the mirror case. A mirror is fixedly secured to the backing plate. The mirror defines a substrate having a first surface and a second surface. The second surface defines a primary mirror surface and a spot mirror surface formed within the second surface. The rearview mirror assembly also includes a heating element fixedly secured to the second surface of the mirror for heating the mirror. The heating element includes a primary portion fixedly secured to the primary surface and a secondary portion fixedly secured to the spot mirror surface.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENTS

Figure 1:
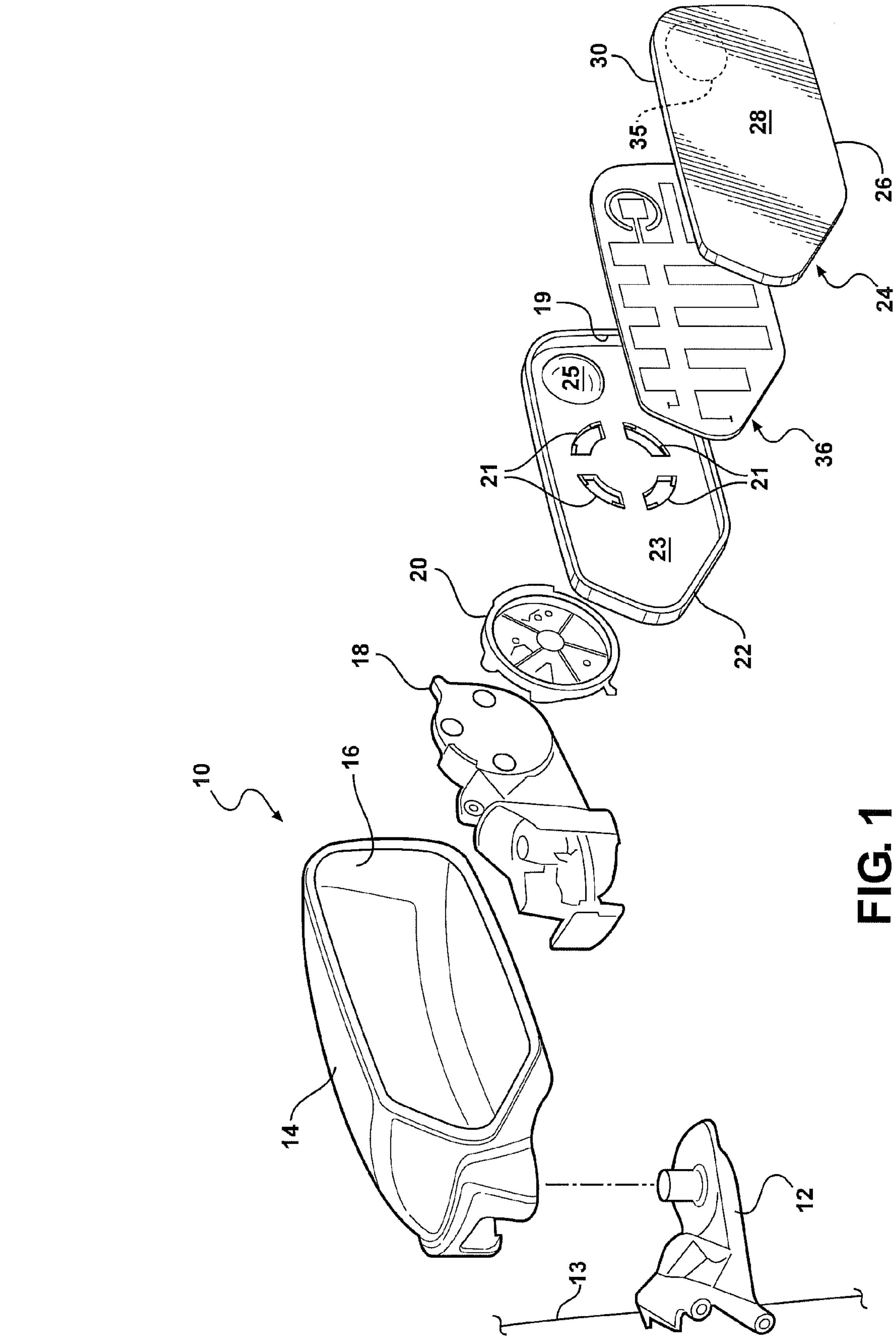
FIG. 1 is an exploded perspective view of one embodiment of the invention.
Figure 2:
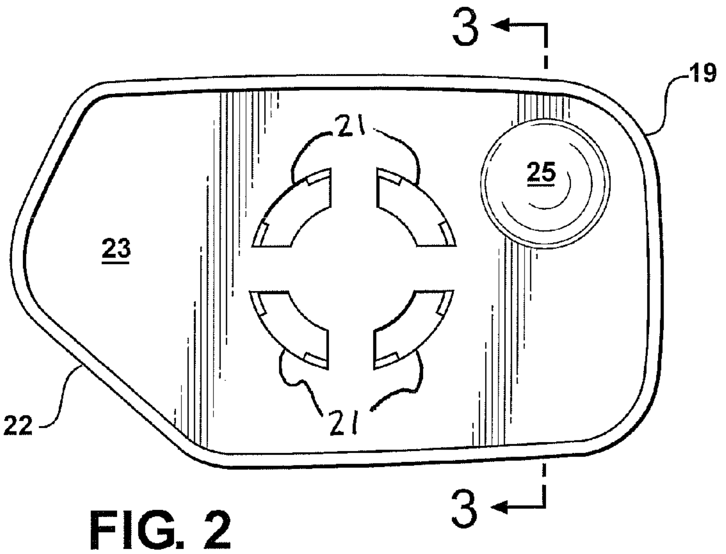
FIG. 2 is a rear view of a backing plate.
Figure 3:
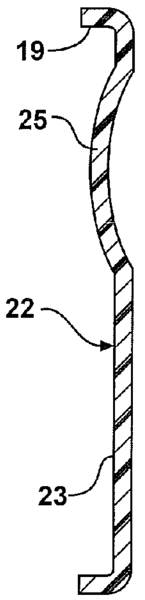
FIG. 3 is a cross-sectional side view taken along lines 3-3 of FIG. 2.

Referring to the Figures, a rearview mirror assembly is generally indicated at 10. The rearview mirror assembly includes a mirror bracket 12 and a minor case 14. The mirror bracket 12 is fixedly securable to a motor vehicle 13 allowing the operator of the motor vehicle 13 to view areas rearward of the motor vehicle 13.

The mirror case 14 defines a mirror opening 16. It should be appreciated by those skilled in the art that while none are shown in the Figures, openings in the mirror case 14 other than the mirror opening 16 may exist without affecting the invention disclosed herein.

A support structure 18 is fixedly secured within the mirror case 14. The support structure 18 may also be pivotally secured to the bracket 12 allowing the mirror case 14 to pivot with respect to the bracket 12 and the motor vehicle 13. The support structure 18 provides a base upon which the mechanisms, discussed in greater detail subsequently, may operate.

In the embodiment shown in the Figures, a motor mechanism 20 is movably secured to the support structure 18 and has at least a portion thereof that moves with respect to the support structure 18 and the mirror case 14. A motor mechanism 20 may not be employed in some models of the mirror assembly 10. In such instances, a manual cable system may be used. In other instances, even a cable system may be absent resulting in positioning performed by directly pushing a mirror surface, discussed subsequently, whereby the mirror surface pivots with respect to the mirror case 14 and maintains a particular position due to a friction fit mechanism (not shown) provided in place of the motor mechanism 20.

A backing plate 22 is fixedly secured to the motor mechanism 20 and is therefore operatively connected to the mirror case 14. In the embodiment shown, the orientation of the backing plate 22 is dependent on the operation of the motor mechanism 20 and will move based thereon. The backing plate 22 may include a rim 19 which may, in certain designs, be used to secure a mirror to the backing plate 22. Apertures 21 extend through the backing plate 22 and allow the backing plate 22 to be secured to the motor mechanism via a snap fit The backing plate 22 also includes a primary backing section 23 and a secondary backing section 25. The primary backing section 23 is larger in area than the secondary backing section 25. While the primary backing section 23 is flat in the embodiment shown (i.e., the radius of curvature is infinite), the primary backing section 23 may have curvature depending on whether the mirror assembly 10 is designed to be mounted to the driver side or the passenger side. The absence or presence of curvature in the primary backing section 23 is also dependent on the laws of a particular country and whether such curvature is permitted, mandated, or prohibited. Regardless, the secondary backing section 25 defines one or more radius (radii) of curvature that is (are) much smaller than that of the primary backing section 23.

Figure 7:
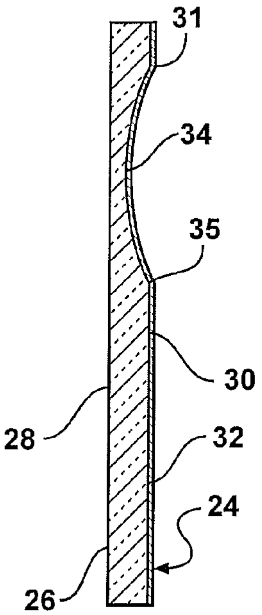
FIG. 7 is a cross-sectional view taken along lines 7-7 of FIG. 6.
Figure 8:
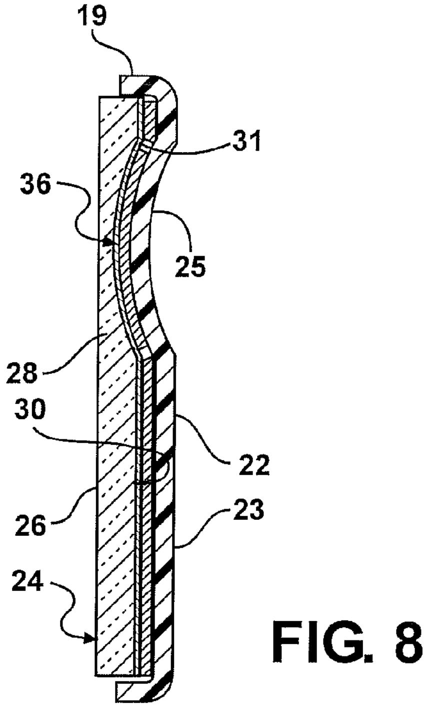
FIG. 8 is a cross-sectional view of a backing plate, a heating element, and a mirror substrate according to one embodiment of the invention.

A mirror 24 is fixedly secured to the backing plate 22 such that there is no lost motion between the mirror 24 and the backing plate 22. The mirror 24 defines a clear substrate 26, e.g., glass, polycarbonate or acrylic, having a first surface 28 and a second surface 30. The second surface 30 defines a primary mirror surface 32 and a spot mirror surface 34. The spot mirror surface 34 defines a periphery 35. In this embodiment, the second surface 30 has a reflective coating 31 (best seen in FIGS. 7 and 8) so that the driver of the motor vehicle 13 to which the rearview mirror assembly 10 is attached will look through the first surface 28 and see a reflection created by the second surface 30. In one embodiment, the substrate 26 is fabricated from glass. Other materials may be contemplated which have physical properties similar to glass.

As with the backing plate 22, the primary mirror surface 32 is either flat or slightly curved, depending on the side of the motor vehicle 13 to which it is attached and/or the territory in which the mirror assembly 10 is to be utilized. Likewise, the spot mirror surface 34 has more curvature (smaller radius (radii) of curvature(s)) allowing the operator of the motor vehicle 13 a greater field of view than is obtainable by viewing only the primary mirror surface 32.

The contours of the primary mirror surface 32 and the spot mirror surface 34 complement the primary backing section 23 and the secondary backing section 25 of the backing plate 22, respectively. Said another way, there are no variations in the distances between any portion of the backing plate 22 and its respective portion of the second surface 30 of the mirror 24.

A heating element, generally shown at 36, is fixedly secured to the second surface 30 of the mirror 24. The heating element 36 heats the mirror 24 to remove any precipitation, in the form of gas, liquid or solid, from the first surface 28 of the mirror 24. The heating element 36 does this by heating the substrate 26 and hence the precipitation to a temperature that allows the precipitation to evaporate.

Figure 4:
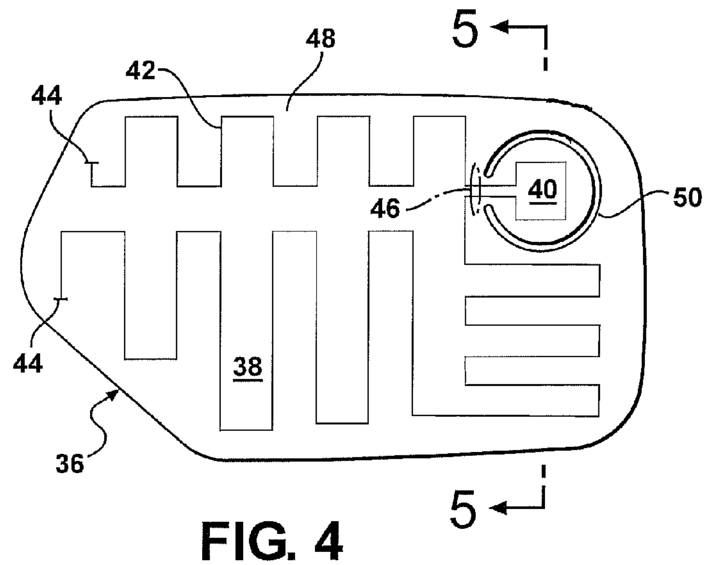
FIG. 4 is a rear view of a heating element.
Figure 5:
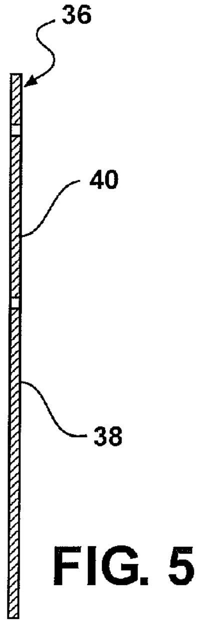
FIG. 5 is a cross-sectional side view taken along lines 5-5 of FIG. 4.
Figure 6:
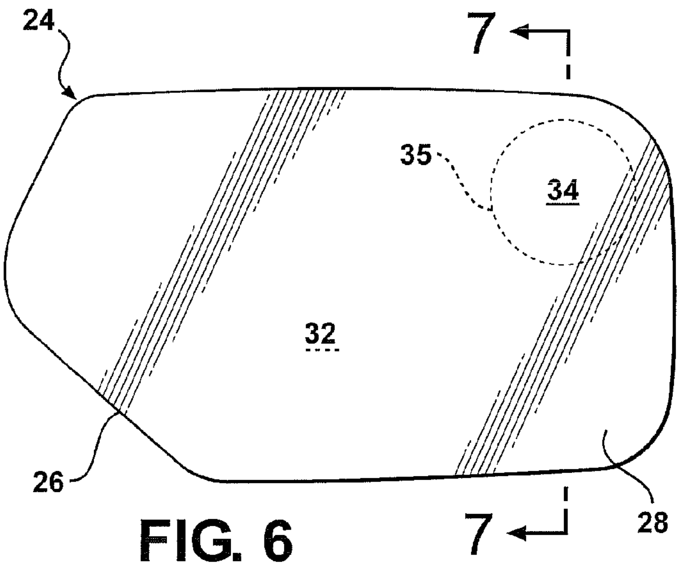
FIG. 6 is a rear view of a mirror substrate.

Referring to FIG. 4, the heating element 36 includes a primary portion 38 and a secondary portion 40. The primary portion 38 is fixedly secured to the primary mirror surface 32, whereas the secondary portion 40 is fixedly secured to the spot mirror surface 34. A cut out 50, described in greater detail subsequently, separates the secondary portion 40 from a portion of the primary portion 38. The cut out 50 may define a partial periphery that may represent the periphery 35 of the spot mirror surface 34.

In one embodiment of the invention, the heating element 36 includes a single conductor 42 that winds its way between the primary 38 and secondary 40 portions. The single conductor 42 defines a serpentine path. The single conductor 42 ends at two terminals 44 which are electrically connected to power using the wire harness (not shown) of the rearview mirror assembly 10 as is known in the art. When an electrical current passes through the conductor 42, the conductor 42 radiates thermal energy, which the substrate 26 then distributes over its entire first surface 28.

The heating element 36 includes a neck 46 that connects the primary 38 and secondary 40 portions. The neck 46 is defined as the portion disposed between the ends of the cut out 50. The heating element 36 also includes a carrier 48 to which the single conductor 42 and the terminals 44 are secured. The carrier 48 is used to facilitate the ease and consistency of applying the single conductor 42 to the second surface 30 of the mirror 24. The carrier 48 defines the cut out 50 that, but for area disposed adjacent the neck 46, circumscribes the secondary portion 40 of the heating element 36. The width of the cut out 50 may vary depending on the shape of the spot mirror surface 34 or its periphery 35. In one embodiment, the carrier 48 has adhesive disposed on both sides that provides the means for securing it to the substrate 26 and to the backing plate 22.

In an alternative embodiment, the heating element may be a layer of conductive material deposited on the carrier 48. The layer of conductive material may be deposited onto the carrier 48 or it may be a foil layer placed between the backing layer and the substrate 26. It should be appreciated by those skilled in the art that the heating element 36 may be any type of material capable of occupying a thin space and conduct thermal energy when an electric current is drawn thereacross.

In operation, the single heating element 36 is applied to the second surface 30 of the mirror 24. Because the cut out 50 exists in the heating element 36, the secondary portion 40 of the heating element 36 can conform to the spot mirror surface 34 of the mirror 24 without unduly deforming the heating element 36. The heating element 36 maybe used for both the primary mirror surface 32 and the spot mirror surface 34 of the second surface 30. In other words, the primary portion 38 and the secondary portion 40 of the heating element 36, which incorporates the single conductor 42 extending through both, is used to provide an adequate means for heating the second surface 30, including both the primary surface 32 and the spot mirror surface 34 in a uniform fashion. The cut out 50 allows the secondary portion 40 to be secured to the spot mirror surface 34, which extends through a curved plane while allowing the primary portion 38 to be secured to the primary mirror surface 32, which extends through a plane of lesser curvature or no curvature.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

We claim:

1. A rearview mirror assembly for a motor vehicle, said rearview mirror assembly comprising:

- a mirror bracket fixedly secured to the motor vehicle;
- a mirror case secured to said mirror bracket, said mirror case defining a mirror opening;
- a backing plate operatively connected to said mirror case;
- a mirror fixedly secured to said backing plate, said mirror defining a substrate having a first surface and a second surface, said second surface defining a primary mirror surface and a spot mirror surface formed within said second surface; and
- a heating element fixedly secured to said second surface of said mirror between said second surface and said backing plate, said heating element heats said mirror, said heating element including a primary portion fixedly secured to said primary mirror surface and a secondary portion fixedly secured to said spot mirror surface.

2. A rearview mirror assembly as set forth in claim 1 wherein said heating element includes a single conductor extending through said primary portion and said secondary portion.

3. A rearview mirror assembly as set forth in claim 2 wherein said heating element includes a neck connecting said primary and secondary portions.

4. A rearview mirror assembly as set forth in claim 3 wherein said primary portion extends through a primary plane and said secondary portion extends through a secondary plane different than said primary plane.

5. A rearview mirror assembly as set forth in claim 4 wherein said heating element includes a carrier defining a cut out.

6. A rearview mirror assembly as set forth in claim 5 wherein said cut out is disposed adjacent said neck of said heating element.

7. A rearview mirror assembly as set forth in claim 6 wherein said backing plate includes a primary backing section and a secondary backing section.

8. A rearview mirror assembly as set forth in claim 7 wherein said backing plate complements said second surface of said substrate such that said primary backing section is disposed adjacent said spot mirror surface and said secondary baking section is disposed adjacent said primary mirror surface.

9. A rearview mirror assembly as set forth in claim 8 wherein said heating element defines a serpentine path through said carrier.

10. A rearview mirror assembly as set forth in claim 9 wherein said serpentine path extends through a surface area correlating to said primary mirror surface and said spot mirror surface.

11. A rearview mirror assembly as set forth in claim 10 wherein said serpentine path is a single path.

12. A rearview mirror assembly as set forth in claim 11 wherein said heating element is a metallic coating applied to said carrier.

13. A rearview mirror assembly as set forth in claim 7 wherein said heating element is a metallic coating applied to said carrier.

* * * * *